United States Patent

Holm et al.

[11] Patent Number: 5,951,479
[45] Date of Patent: Sep. 14, 1999

[54] METHOD AND APPARATUS FOR SYNTHETIC TRANSMIT APERTURE IMAGING

[75] Inventors: Sverre Holm, Asker; Hongxia Yao, Oslo, both of Norway

[73] Assignee: General Electric Company, Schenectady, N.Y.

[21] Appl. No.: 09/162,848

[22] Filed: Sep. 29, 1998

[51] Int. Cl.[6] .................................................. A61B 8/00
[52] U.S. Cl. ........................................... 600/447; 600/443
[58] Field of Search .................................. 600/441, 443, 600/447, 449, 444; 128/916

[56] References Cited

U.S. PATENT DOCUMENTS

| | | | |
|---|---|---|---|
| 4,553,437 | 11/1985 | Luthra et al. | 73/602 |
| 4,604,697 | 8/1986 | Luthra et al. | 364/414 |
| 5,329,929 | 7/1994 | Sato et al. | 600/441 |
| 5,779,641 | 7/1998 | Hatfield et al. | 600/443 |

OTHER PUBLICATIONS

Holm et al., "Improved framerate with synthetic transmit aperture imaging using prefocused subapertures," IEEE Ultrasonics Symposium, Toronto, Oct. 1997, pp. 1–4.

*Primary Examiner*—Francis J. Jaworski
*Assistant Examiner*—Maulin Patel
*Attorney, Agent, or Firm*—Marvin Snyder; Douglas E. Stoner

[57] ABSTRACT

An ultrasound imaging system uses a synthetic transmit aperture method with prefocused subapertures. The transmit aperture is divided into several subapertures. Transmission is done sequentially on each subaperture while receiving on the full aperture. The received data sets are then combined using the appropriate delays. In this way the focusing performance of a composite focusing system using a number of focal zones equal to the square of the number of subapertures is achieved. The gain is an increase in the frame rate which is also equal to the number of subapertures used.

21 Claims, 2 Drawing Sheets

METHOD AND APPARATUS FOR SYNTHETIC TRANSMIT APERTURE IMAGING

FIELD OF THE INVENTION

This invention generally relates to ultrasound imaging of the human anatomy for the purpose of medical diagnosis and, more particularly, the invention relates to methods and apparatus for B-mode imaging of human tissue by transmitting ultrasound waves into the tissue and then detecting ultrasound echoes reflected therefrom

BACKGROUND OF THE INVENTION

Conventional ultrasound imaging systems comprise an array of ultrasonic transducer elements which transmit an ultrasound beam and receive the reflected beam from the object being studied. Such scanning comprises a series of measurements in which the focused ultrasonic wave is transmitted, the system switches to receive mode after a short time interval, and the reflected ultrasonic wave is received, beamformed and processed for display. Typically, transmission and reception are focused in the same direction during each measurement to acquire data from a series of points along an acoustic beam or scan line. The receiver is dynamically focused at a succession of ranges along the scan line as the reflected ultrasonic waves are received.

For ultrasound imaging, the array typically has a multiplicity of transducer elements arranged in one or more rows and driven with separate voltages. By selecting the time delay (or phase) and amplitude of the applied voltages, the individual transducer elements in a given row can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. In the case of a steered array, by changing the time delays and amplitudes of the applied voltages, the beam with its focal point can be moved in a plane to scan the object. In the case of a linear array, a focused beam directed normal to the array is scanned across the object by translating the aperture across the array from one firing to the next.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer element.

An ultrasound image is composed of multiple image scan lines. A single scan line (or small localized group of scan lines) is acquired by transmitting focused ultrasound energy at a point in the region of interest, and then receiving the reflected energy over time. The focused transmit energy is referred to as a transmit beam. During the time after transmit, one or more receive beamformers coherently sum the energy received by each channel, with dynamically changing phase rotation or delays, to produce peak sensitivity along the desired scan lines at ranges proportional to the elapsed time. The resulting focused sensitivity pattern is referred to as a receive beam. Resolution of a scan line is a result of the directivity of the associated transmit and receive beam pair.

The output signals of the beamformer channels are coherently summed to form a respective pixel intensity value for each sample volume in the object region or volume of interest. These pixel intensity values are log-compressed, scan-converted and then displayed as an image of the anatomy being scanned.

Operators of abdominal ultrasound imaging systems often use several transmit zones per direction in order to obtain a better focused image. For each scan line, transmit focus is varied so that the image is made up of individual zones with optimized focus. There may be up to M=10–15 transmit focal zones. The resulting images are "stitched" together, giving a composite image.

The size of each zone is proportional to the depth of field $$L \sim \lambda(R/D)^2$$

where R is the focal depth, D is the aperture and $\lambda$ is the wavelength. For a constant f/number (=R/D) and wavelength and with M zones, the useful range is $$L_{zones} = M \times L$$

This composite method provides more uniform image quality and is routinely employed in radiology ultrasound equipment. This method depends on the object to be imaged being stationary during all M image acquisitions, and is also dependent on accurate gain matching between the zones in order for the image to appear as a single image of uniform brightness without bands.

In many situations one would desire the high image quality of this method, but the imaged object is not stationary enough to allow for all the M transmit zones to be acquired without motion artifacts. Since M zones cause the frame rate to be reduced by a factor of almost 1/M compared to using just a single transmit focal zone, the problem is that the achieved image update rate or frame rate is not high enough.

The synthetic aperture focusing technique is the classical synthetic aperture method where, in each instant, only a single element is used for transmission and reception. Simple transmit and receive electronics are needed, but the synthetic aperture focusing technique requires data memory for all N data recordings. Multi-element synthetic aperture focusing is an improvement, which increases acoustic power and signal-to-noise ratio.

Synthetic focusing is a method where, in each instant, one element transmits a pulse and all elements receive echo signals. This approach allows full dynamic focusing during both transmit and receive, which yields the highest image quality. Unlike the synthetic aperture focusing technique, a full data set of $N^2$ RF-lines is used and needs to be stored. Like the synthetic aperture focusing technique, synthetic focusing may be sensitive to motion artifacts.

A synthetic receive aperture technique has also been proposed to enable an imaging system to address a large number of transducer receive elements without the same number of receive channels.

There is need for a method of focusing that provides the high image quality of the composite method without as much of a reduction in frame rate. This method should require fewer transmits and less RF memory than that required by the synthetic focusing method.

SUMMARY OF THE INVENTION

The present invention concerns a method and apparatus that uses transmit subapertures prefocused near the middle of the region of interest. The invention is proposed as a substitute for composite focusing, commonly used in abdominal ultrasound imaging. In the latter method, M transmit zones are stitched together in order to achieve close to dynamic transmit focusing. The depth of focus of each zone is proportional to the inverse square of the aperture D, and the focused region is approximately M times that depth of focus.

In a preferred embodiment of the invention, the aperture is divided into $K_s$ non-overlapping subapertures of size $D/K_s$. Each subaperture transmits a prefocused beam with dynamic focusing on the full aperture on reception. Data from the subapertures is combined using synthetic aperture processing. This synthetic aperture method is herein referred to as synthetic transmit aperture (STA). The depth of focus for each subaperture is $K_s^2$ times that of the full aperture. Thus the equivalent of composite focusing with $M=K_s^2$ zones is achieved with $K_s$ subapertures, and a frame rate increase of $K_s$ is achieved. In addition to the increase in frame rate, the focusing is of more uniform quality since it degrades gradually away from the prefocus and does not have any zone patterns.

In advanced composite focusing systems, additional improvements in image quality are achieved by varying transmit parameters such as aperture, frequency and pulse repetition frequency in each zone. This leads to improved near-fields and a faster update rate. In an alternative embodiment of the invention, a hybrid of composite focusing and the synthetic transmit aperture method combines the advantages of both methods. Assume that $K_s=2$ subapertures are used with $M_f=4$ different transmit foci. The number of transmits required is $K_s \times M_f=8$, and the equivalent number of zones is $M=K_s^2 \times M_f=16$. The approximate frame rate increase is still $K_s=2$, which in this case is reduced to half of what it could have been ($\sqrt{M}$).

Sometimes transmit apodization is used in order to increase contrast resolution at the cost of detail resolution. In a third alternative embodiment of the invention, a method using apodized overlapping subapertures results in freedom to gain contrast resolution at the cost of reduced detail resolution and frame rate. Assuming a 50% overlap, the frame rate will decrease due to the need to transmit $K_s=2K-1$ times, or almost twice as many times to achieve the same focusing performance. Thus, in this example, the method results in a depth of focus which is $K^2$ times that obtained when using a single transmit aperture, while the frame rate increase is $K_s$. The gain in frame rate over a system using composite focusing is $K^2/K_s=K^2/(2K-1)$, which is less than the gain K obtained using non-overlapping subapertures, yet still greater than unity.

In a fourth embodiment, the hybrid of composite focusing and the synthetic transmit aperture method is combined with the apodized overlapping subapertures.

DETAILED DESCRIPTION OF THE PREFERRED EMBODIMENTS

Figure 1:
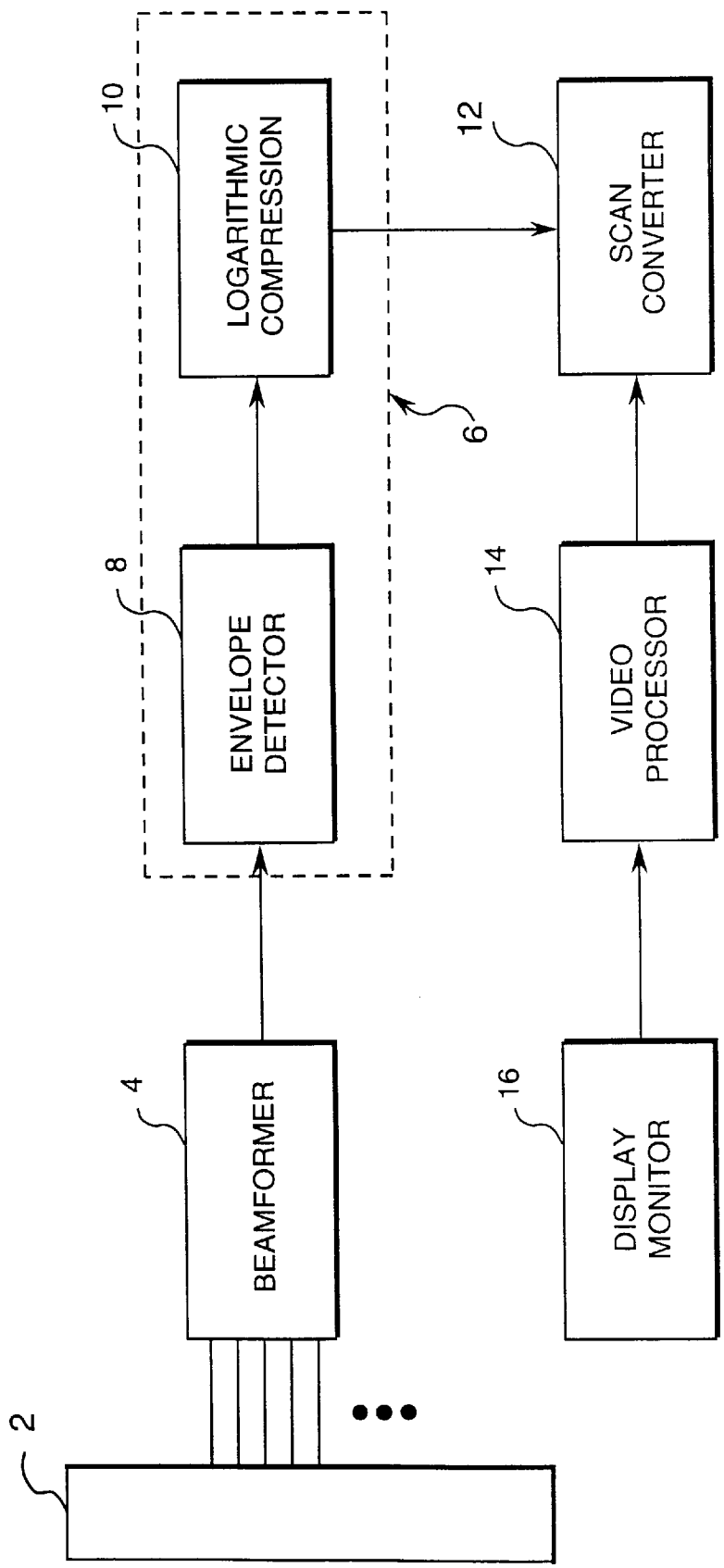
FIG. 1 is a block diagram showing the major functional subsystems within a real-time ultrasound imaging system.

The present invention may be incorporated in an ultrasound imaging system of the type generally depicted in FIG. 1. The individual elements of an ultrasound transducer array 2 are activated by a beamformer 4 to transmit wavelets that are focused at the same transmit focal position with the same transmit characteristics to form a transmit beam. Each transmit beam propagates through the object being scanned and is reflected by ultrasound scatterers in the object back to the array. After each transmit firing, the echo signals detected by the transducer array elements are fed to respective receive channels of beamformer 4. The receive beamformer tracks echoes under the direction of a master controller (not shown). The receive beamformer imparts the proper receive focus time delays to the received echo signal and sums them to provide an echo signal which accurately indicates the total ultrasonic energy reflected from a succession of ranges corresponding to a particular transmit focal zone.

In an RF system, the beamsummed RF echo signals are sent to a B-mode processor 6, which incorporates an envelope detector 8 for forming the envelope of the beamsummed signal. The envelope of the signal undergoes some additional B-mode processing, such as logarithmic compression 10, to form display data which are supplied to a scan converter 12. Although the preferred embodiment is described hereinafter with reference to an RF system, it should be understood that the invention can also be applied to a baseband system wherein the RF signal is demodulated to baseband and then the in-phase and quadrature components are processed separately.

In general, the display data are converted by scan converter 12 into X-Y format for video display. Each frame of intensity data, representing one of a multiplicity of parallel scans or slices through the object being examined, is stored in scan converter 12 and in the next cycle is transmitted to video processor 14, which maps the video data to a gray scale for video display. The gray scale image frames are then sent to video monitor 16 for display.

The images displayed by video monitor 16 are produced from an image frame of data in which each datum indicates the intensity or brightness of a respective pixel in the display. An image frame may, e.g., comprise a 256×256 data array in which each intensity datum is an 8-bit binary number that indicates pixel brightness. The brightness of each pixel on display monitor 16 is continuously refreshed by reading the value of its corresponding element in the data array in a well-known manner. Each pixel has an intensity value which is a unction of the backscatter cross section of a respective sample volume in response to interrogating ultrasonic pulses and the gray map employed. A conventional ultrasound imaging system typically employs a variety of gray maps, which are simple transfer functions of the raw acoustic sample data to display gray values.

The invention provides improved focusing of ultrasound images using a synthetic transmit aperture. The method, in accordance with a preferred embodiment, comprises dividing the transmit aperture into several non-overlapping subapertures. Transmission is done sequentially on each subaperture while receiving on the full aperture. The received data sets are then combined using the proper delays. In this way, the focusing performance of a composite focusing system using a number of focal zones equal to the square of the number of subapertures is achieved. The gain is an increase in the frame rate, which is also equal to the number of subapertures used. The method can be implemented in real time with the addition of an RF-memory and a second-stage beamformer typically having 2–4 inputs to the system generally depicted in FIG. 1.

A synthetic aperture imaging system in accordance with a preferred embodiment has an aperture D which is split into $K_s$ non-overlapping subapertures of size $D_s = D/K_s$.

Each of the subapertures is prefocused and the useful image range is $$L_{STA} \lambda (R/D_s)^2 = K_s^2 \lambda (R/D)^2.$$

The result is that the depth of field is $$L_{STA} = K_s^2 L.$$

Thus $K_s$ pulses in the synthetic transmit aperture (STA) mode yield the same depth of focus as $M = K_s^2$ pulses in the composite mode. The increase in frame rate is $K_s$. Complexity is somewhat increased since $K_s$ lines of received RF data need to be stored and processed together using depth-varying delays. On the other hand, there is no need for accurate matching of gain between zones as in the multiple-zone composite method.

For an N-element aperture, the transmit aperture is split into $K_s$ subapertures with $N_s = N/K$ elements each. Each subaperture transmits a prefocused beam with focus point near the middle of each region of interest. That focus point is scanned in the azimuth direction to form a scan plane. Echo signals reflected from objects are received at a full or dynamically varying receive aperture with dynamic focusing, and stored in memory. All data recordings must then be focused synthetically with dynamic transmit focusing.

For each image point $(r, \theta)$, the A-scan signal is $$a_{STA}(t) = \sum_{n=0}^{N-1} \sum_{i=0}^{K_s-1} \sum_{m=0}^{N_s-1} s_{N_s i + m, n}(t - \tau_n - \tau_i - \tau_m) \quad (1)$$

where $S_{m,n}(t)$ is the echo signal from transmit element m received at element n; $\tau_m$ is the transmit delay on each subaperture; $\tau_i$ is the transmit delay in order to sum subaperture signals; and $\tau_n$ is the dynamically varying receive delay. The first summation corresponds to receive beamforming, the second summation is the synthetic transmit aperture processing and the third summation is the transmit subaperture prefocusing. The resulting two-way, far-field, continuous wave beam pattern is the same for an STA system as that for a phased array. This is achieved without any overlap between subapertures. This result can easily be extended to include receive apodization.

Division of the transmit aperture in a phased array system into $K_s$ subapertures allows one to choose the amount of transmit focusing. In an array having N elements, a subaperture of just a single element ($K_s = N$) provides full dynamic focusing on transmit, while no subdivision ($K_s = 1$) provides a fixed transmit focus. The invention encompasses the range $1 < K_s < N$, where $K_s$ is an integer. A subdivision into two to four subapertures ($K_s = 2-4$) is realistic from the point of view of maintaining coherence subject to normal tissue movements and has the advantage of providing an increase in the transmit depth of field which is equivalent to using composite imaging with $K_s^2$ transmit zones. The acquisition time for this method is decreased by a factor of $K_s$ compared to composite imaging of equivalent quality.

Use of non-overlapping subapertures provides the fastest image update rate since the number of transmits is $K_s$ when the aperture is divided into subapertures of size $D_s = D/K_s$. In terms of sidelobes and beamwidth, use of non-overlapping subapertures is equivalent to transmitting with a full non-apodized aperture.

An alternative realization uses apodized transmit subapertures. The use of apodization increases contrast resolution at the cost of detail resolution. Since apodization usually tapers down at the ends of the subapertures, it is customary to use substantial overlap, often 50% or even 75%, in order to utilize all elements of the aperture properly. For 50% overlap the frame rate decreases due to the need to form $K_s = 2K - 1$ subapertures. Here K is the ratio of the length of the full aperture to the length of the subaperture and $K_s$ is the number of subapertures. Without overlap they are equal: $K_s = K$. Any combination of apodization from none to any standard or non-standard apodization function combined with no overlap to almost full overlap can be considered. Using this alternative embodiment with 50% overlap as an example, the aperture of size D will be split into $K_s$ overlapping subapertures of size $$D_s = D/K$$

where $K_s = 2K - 1$ due to the overlap. Each of the subapertures is prefocused, and the useful image range is $$L_{STA} \lambda (R/D)^2 = K^2 \lambda (R/D)^2.$$

The result is that the depth of field is $$L_{STA} = K^2 L.$$

Thus $K_s$ pulses in the STA mode with 50% overlap yield the same depth of focus as $M = K^2$ pulses in the composite mode. The increase in frame rate is $$K^2/K_s = K^2/(2K - 1) \approx K/2.$$

$K_s$ lines of received raw data need to be stored and processed together using depth-varying delays.

Figure 2:
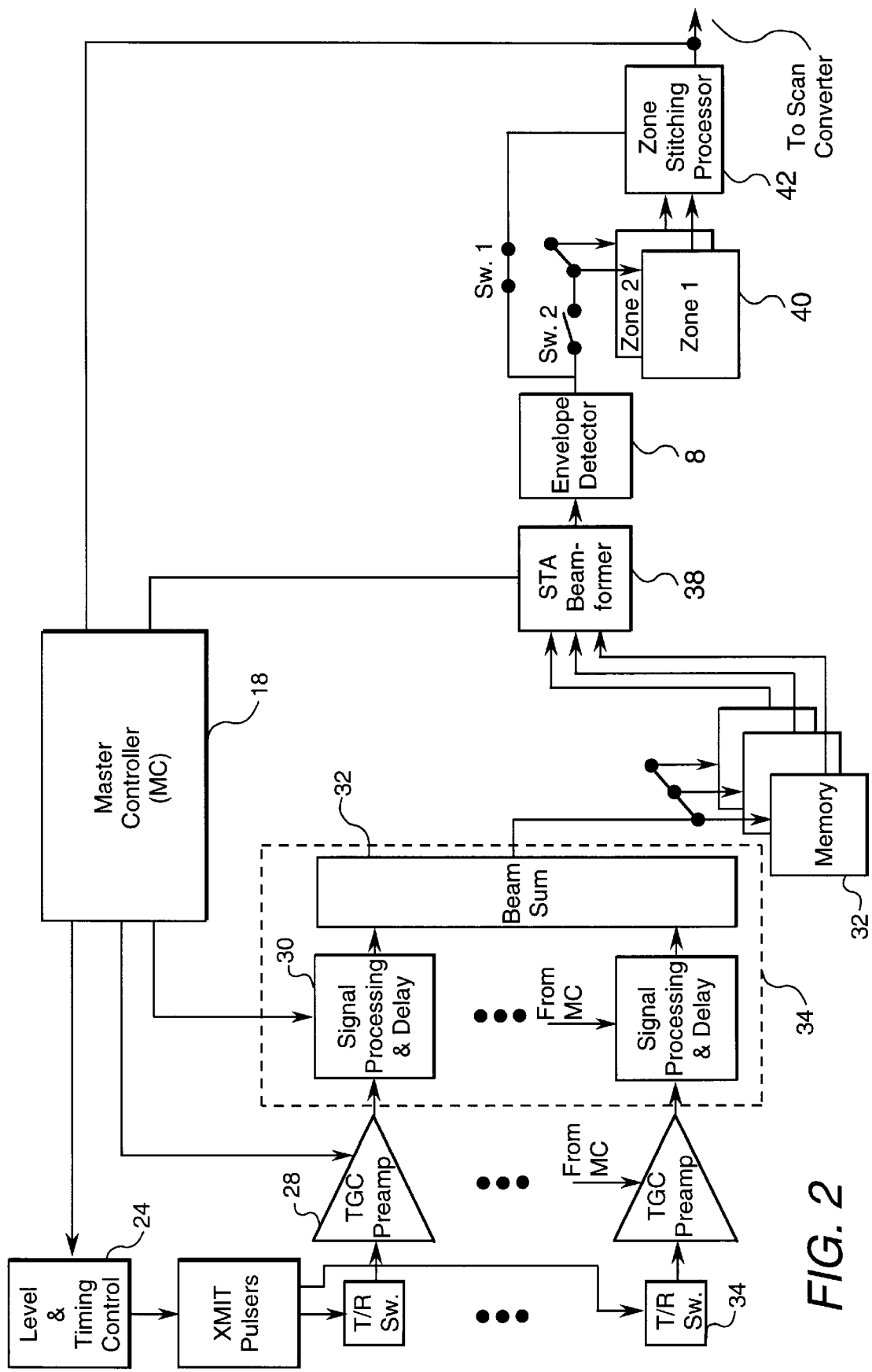
FIG. 2 is a block diagram showing preferred embodiments of the invention.

The front end and mid-section of an ultrasound imaging system in accordance with the preferred embodiments of the invention are depicted in FIG. 2. System control is centered in a master controller 18 (or host computer), which accepts operator inputs through an operator interface (not shown) and in turn controls the various subsystems. Master controller 18 also generates the system timing and control signals which are distributed via various control buses. Transducer array 2 is comprised of a plurality of separately driven transducer elements 20, each of which produces a burst of ultrasonic energy when energized by a pulsed waveform produced by a transmitter comprising transmit pulsers 22 and a level/timing controller 24 that acts as a transmit beamformer. The ultrasonic energy reflected back to transducer array 2 from an object under study is converted to an electrical signal by each receiving transducer element 20 and applied separately to a receiver through a set of transmit/receive (T/R) switches 26, which are typically diodes that protect the receive electronics from the high voltages generated by the transmit electronics. The transmit signal causes the diodes to shut off or limit the signal to the receiver, which comprises a respective TGC preamplifier 28 and signal processing and delay apparatus 30 for each receive line and a beamsummer 32. The transmitter and receiver are operated under the control of master controller 18 responsive to commands by a human operator. A complete scan is performed by acquiring a series of echoes in which the transmitter is gated ON momentarily to energize each transducer element 20, and the subsequent echo signals produced by each transducer element 20 are applied to the receiver. A channel may begin reception while another channel is still transmitting. Beamsummer 32 combines the separate echo signals from each transducer element 20 to produce a single echo signal which is used to produce a line in an image on a display monitor (not shown in FIG. 2).

Master controller 18 determines the conditions under which the acoustic pulses will be transmitted. With this information, level/timing controller 24 determines the timing and amplitudes of each of the transmit pulses to be generated by pursers 22. The timing controller functions as a transmit beamformer. Under the direction of master controller 18, the transmitter drives a first transmit subaperture of transducer array 2 such that the ultrasonic energy is transmitted as a directed focused beam to the middle of a region of interest. To accomplish this, respective amplitudes and time delays are imparted to a multiplicity of pulsers 22 by level/timing controller 24. In particular, the amplitude is set to zero for all transducer elements not included in the first transmit subaperture. The amplitude of each transmit pulse is generated by an apodization generation circuit (incorporated in controller 24) which, for example, may comprise a set of digital-to analog converters that take weighting data from the master controller and apply them to pulsers 22. Pulsers 22, in turn, send the transmit pulses to each of elements 20 making up the first transmit subaperture of transducer array 2 via T/R switches 26, which protect TGC preamplifiers 28 from the high voltages which may exist at the transducer array. By appropriately adjusting the transmit focus time delays in conventional manner and also adjusting the apodization weightings, a respective ultrasonic beam can be directed at, and focused in, a particular transmit focal zone for each of $K_s$ non-overlapping transmit subapertures.

The echo signals produced by each burst of ultrasonic energy reflect from objects located at successive ranges along each ultrasonic beam. The echo signals are sensed separately by each transducer element 20 and a sample of the magnitude of the echo signal at a particular point in time represents the amount of reflection occurring at a specific range.

Due to differences in propagation paths between a reflecting point and each transducer element 20 of a given transmit subaperture, the echo signals are not detected simultaneously and their amplitudes are not equal. The receiver amplifies the separate echo signals via respective TGC preamplifiers 28 in respective receive channels. The amount of amplification provided by the TGC preamplifiers is controlled through a control line (not shown) driven by a TGC circuit (not shown). The TGC circuit may be set by hand operation of potentiometers or any other suitable means. The amplified echo signals are fed to receive beamformer 34 comprised of a signal processing and delay 30 for each receive channel, and beamsummer Under direction of master controller 18, receive beamformer 34 tracks the direction of each transmitted beam, sampling the echo signals at a succession of ranges along each beam. Signal processing and delay 30 imparts the proper time delay to each amplified echo signal. For each point at a particular range along the transmitted beam, beamsummer 32 provides an echo signal that accurately indicates the total ultrasonic energy reflected from that point. The receive focus time delays are computed in real-time using specialized hardware, or are read from a lookup table. Signal processing and delay 30 includes circuitry for filtering the received pulses. The time-delayed receive signals for each transmit subaperture are summed and stored in a respective memory 36, i.e., one memory per transmit subaperture. Each memory 36 is, in turn, coupled to a respective input channel of a second-stage STA beamformer 38, i.e., one input channel per transmit subaperture. Synthetic transmit aperture beamformer 38 applies the transmit delays $\tau_i$ (see Eq. (1)) in order to sum the subaperture signals supplied by respective memories 36. The result is then furnished to envelope detector 8, which converts the synthetic transmit aperture signal to display data. In the B-mode (gray-scale), the envelope of the signal undergoes additional processing (not shown in FIG. 2), such as edge enhancement and logarithmic compression. In a preferred embodiment, the envelope detected signal is supplied to the scan converter via a closed switch SW1. The foregoing process is repeated for each one of a multiplicity of scan angles measured relative to the center of the transducer array. The quality of the final synthetic transmit aperture image is comparable to that produced in a system with a large number of transmit zones, with the benefit of improved frame rate.

In advanced composite focusing systems, additional improvements in image quality are achieved by varying transmit parameters such as aperture, frequency and pulse repetition frequency in each zone. This leads to improved near-fields and faster update rate. A hybrid of composite focusing and STA will combine the advantages of both methods.

FIG. 2 also illustrates an alternative hybrid embodiment that combines composite focus and synthetic transmit aperture when switch SW1 is opened and switch SW2 is closed. This hybrid method trades off update rate for near-field improvements. Each transmit subaperture will be fired $M_f$ times, with different transmit focal zones and different transmit parameters each time. The envelope-detected summed subaperture signal for each transmit focal zone is stored in a respective focal zone memory 40, i.e., one memory per transmit focal zone. Each memory 40 is, in turn, coupled to a respective input channel of a zone stitching processor 42, i.e., one input channel per transmit focal zone. For the sake of simplicity, FIG. 2 shows only two memories 40 corresponding to the situation when $M_f=2$; however, $M_f$ can be greater than 2. The envelope-detected summed subaperture signals for all of the transmit focal zones are stitched together in conventional fashion by zone stitching processor 42 and output to the scan converter.

The foregoing preferred embodiments have been disclosed for the purpose of illustration. Variations and modifications of the basic concept of the invention will be readily apparent to those skilled in the pertinent art. For example, the synthetic transmit aperture method described herein can be extended to 1.25D, 1.5D, 1.75D and 2D arrays. As used herein, these terms have the following meanings: 1.25D) elevation aperture is variable, but focusing remains static; 1.5D) elevation aperture, shading, and focusing are dynamically variable, but symmetric about the centerline of the array; 1.75D) elevation geometry and control are similar to 1.5D, but without the symmetry constraint; and 2D) elevation geometry and performance are comparable to azimuth, with full electronic apodization, focusing and steering. In addition, although the preferred embodiment uses the full aperture on reception, the invention also encompasses the idea of dynamically varying the receive aperture with changes in depth, e.g., increasing the width of a symmetric receive aperture with increasing depth.

While only certain preferred features of the invention have been illustrated and described, many modifications and changes will occur to those skilled in the art. It is, therefore, to be understood that the appended claims are intended to cover all such modifications and changes as fall within the true spirit of the invention.

We claim:

1. A system for imaging ultrasound scatterers, comprising:
   an ultrasound transducer array including a multiplicity of transducer elements;

a transmit beamformer programmed to cause said transducer array to transmit first through $K_s$-th beams from first through $K_s$-th transmit subapertures during first through $K_s$-th firings respectively, where $K_s$ is a positive integer greater than 1, said first through $K_s$-th beams being focused in a first transmit focal zone;

a receive beamformer programmed to form first through $K_s$-th beamsummed receive signals from first through $K_s$-th sets of signals transduced by said transducer array following transmission of said first through $K_s$-th beams respectively;

a synthetic transmit aperture beamformer programmed to sum said first through $K_s$-th beamsummed receive signals with a first set of transmit delays to produce a first synthetic transmit aperture signal;

a detector for forming a first image signal derived from said first synthetic transmit aperture signal; and a display subsystem for displaying an image having a first image portion which is a function of said first image signal.

2. The system as defined in claim 1, wherein said transmit beamformer is further programmed to cause said transducer array to transmit $(K_s+1)$-th through $2K_s$-th beams from said first through $K_s$-th transmit subapertures during $(K_s+1)$-th through $2K_s$-th firings respectively, said $(K_s+1)$-th through $2K_s$-th beams being focused in a second transmit focal zone having a range different than that of said first transmit focal zone; said receive beamformer being further programmed to form $(K_s+1)$-th through $2K_s$-th beamsummed receive signals from $(K_s+1)$-th through $2K_s$-th sets of signals transduced by said transducer array following transmission of said $(K_s+1)$-th through $2K_s$-th beams respectively; said synthetic transmit aperture beamformer being further programmed to sum said $(K_s+1)$-th through $2K_s$-th beamsummed receive signals with a second set of transmit delays to produce a second synthetic transmit aperture signal; said detector further forming a second image signal derived from said second synthetic transmit aperture signal; said system further comprising a zone stitching processor programmed to stitch said first and second image signals together as part of a composite image signal for display by said display subsystem.

3. The system as defined in claim 1, wherein said first through $K_s$-th transmit subapertures are non-overlapping.

4. The system as defined in claim 1, wherein said first through $K_s$-th transmit subapertures are apodized and overlapping.

5. The system as defined in claim 1, further comprising a master controller coupled to program said transmit beamformer, said receive beamformer and said synthetic transmit aperture beamformer.

6. The system as defined in claim 2, further comprising a master controller coupled to program said transmit beamformer, said receive beamformer, said synthetic transmit aperture beamformer and said zone stitching processor.

7. A method for operating an ultrasound imaging system having an array of transducer elements, comprising the steps of:

driving a first subaperture of said array with a first set of time delays to form a first beam focused in a first transmit focal zone;

forming a first beamsummed signal from a first set of signals transduced by transducer elements of said array which form a receive aperture following transmission of said first beam;

driving a second subaperture of said transducer array with a second set of time delays to form a second beam focused in said first transmit focal zone;

forming a second beamsummed signal from a second set of signals transduced by said transducer elements of said receive aperture following transmission of said second beam; and producing a first synthetic transmit aperture signal by beamforming at least said first and second beamsummed receive signals.

8. The method as defined in claim 7, further comprising the steps of:

driving said first subaperture of said array with a third set of time delays to form a third beam focused in a second transmit focal zone having a range different than that of said first transmit focal zone;

forming a third beamsummed signal from a third set of signals transduced by said transducer elements of said receive aperture following transmission of said third beam;

driving said second subaperture of said transducer array with a fourth set of time delays to form a fourth beam focused in said second transmit focal zone;

forming a fourth beamsummed signal from a fourth set of signals transduced by said transducer elements of said receive aperture following transmission of said fourth beam;

beamforming at least said third and fourth beamsummed receive signals so as to produce a second synthetic transmit aperture signal; and combining at least said first and second synthetic transmit aperture signals to form a composite synthetic transmit aperture signal.

9. The method as defined in claim 7, wherein said first and second subapertures are non-overlapping.

10. The method as defined in claim 7, wherein said first and second subapertures are apodized and overlapping.

11. An ultrasound imaging system comprising:

an array of transducer elements;

means for driving a first subaperture of said array with a first set of time delays to form a first beam focused in a first transmit focal zone;

means for forming a first beamsummed signal from a first set of signals transduced by transducer elements of said array which form a receive aperture following transmission of said first beam;

means for driving a second subaperture of said transducer array with a second set of time delays to form a second beam focused in said first transmit focal zone;

means for forming a second beamsummed signal from a second set of signals transduced by said transducer elements of said receive aperture following transmission of said second beam;

means for producing a first synthetic transmit aperture signal by beamforming at least said first and second beamsummed receive signals;

a detector for forming a first image signal derived from said first synthetic transmit aperture signal; and means for displaying an image having a first image portion which is a function of said first image signal.

12. The ultrasound imaging system as defined in claim 11, further comprising:

means for driving said first subaperture of said array with a third set of time delays to form a third beam focused in a second transmit focal zone having a range different than that of said first transmit focal zone;

means for forming a third beamsummed signal from a third set of signals transduced by said transducer elements of said receive aperture following transmission of said third beam;

means for driving said second subaperture of said transducer array with a fourth set of time delays to form a fourth beam focused in said second transmit focal zone;

means for forming a fourth beamsummed signal from a fourth set of signals transduced by said transducer elements of said receive aperture following transmission of said fourth beam;

means for producing a second synthetic transmit aperture signal by beamforming at least said third and fourth beamsummed receive signals; and means for forming a composite synthetic transmit aperture signal for display by combining at least said first and second synthetic transmit aperture signals.

13. The system as defined in claim 11, wherein said first and second subapertures are non-overlapping.

14. The system as defined in claim 11, wherein said first and second subapertures are apodized and overlapping.

15. A method for operating an ultrasound imaging system having an array of transducer elements, comprising the steps of:

driving a first subaperture of said array with a first set of time delays to form a first beam focused in a first transmit focal zone;

forming a first beamsummed signal from a first set of signals, transduced by transducer elements of said array, which form a first receive aperture following transmission of said first beam;

driving a second subaperture of said transducer array with a second set of time delays to form a second beam focused in said first transmit focal zone;

forming a second beamsummed signal from a second set of signals transduced by said transducer elements of said receive aperture following transmission of said second beam;

producing a first synthetic transmit aperture signal by beamforming at least said first and second beamsummed receive signals;

driving said first subaperture of said array with a third set of time delays to form a third beam focused in a second transmit focal zone having a range different than that of said first transmit focal zone;

forming a third beamsummed signal from a third set of signals transduced by transducer elements of said array which form a second receive aperture following transmission of said third beam, said first and second receive apertures being different;

driving said second subaperture of said transducer array with a fourth set of time delays to form a fourth beam focused in said second transmit focal zone;

forming a fourth beamsummed signal from a fourth set of signals transduced by said transducer elements of said second receive aperture following transmission of said fourth beam;

beamforming at least said third and fourth beamsummed receive signals so as to produce a second synthetic transmit aperture signal; and combining at least said first and second synthetic transmit aperture signals to form a composite synthetic transmit aperture signal.

16. The method as defined in claim 15, wherein each of said first and second receive apertures are symmetric relative to a center of said transducer array.

17. A system for imaging ultrasound scatterers, comprising:

an ultrasound transducer array including a multiplicity of transducer elements;

a transmit beamformer coupled to said transducer array in a transmit mode;

a receive beamformer selectively coupled to said transducer array in a receive mode;

a first memory for storing beamsummed receive signals produced by said receive beamformer;

a synthetic transmit aperture beamformer coupled to said first memory;

a controller programmed and connected to:
  (a) provide said transmit beamformer with transmit control data that cause said transducer array to transmit first through $K_s$-th beams from first through $K_s$-th transmit subapertures during first through $K_s$-th firings respectively, where $K_s$ is a positive integer greater than or equal to 2, and said first through $K_s$-th beams are focused in a first transmit focal zone;
  (b) provide said receive beamformer with receive control data that cause said receive beamformer to form first through $K_s$-th beamsummed receive signals from first through $K_s$-th sets of signals transduced by said transducer array following transmission of said first through $K_s$-th beams respectively; and
  (c) provide said synthetic transmit aperture beamformer with synthetic transmit aperture control data that causes said synthetic transmit aperture beamformer to sum said first through $K_s$-th beamsummed receive signals to produce a first synthetic transmit aperture signal;

a detector for forming a first image signal derived from said first synthetic transmit aperture signal; and a display subsystem for displaying an image having a first image portion which is a function of said first image signal.

18. The system as defined in claim 17, further comprising:

a second memory for storing image signals output by said detector; and a zone stitching processor coupled to said second memory;

wherein said controller is further programmed and connected to:
  (a) provide said transmit beamformer with transmit control data that cause said transducer array to transmit $(K_s+1)$-th through $2K_s$-th beams from said first through $K_s$-th transmit subapertures during $(K_s+1)$-th through $2K_s$-th firings respectively, said $(K_s+1)$-th through $2K_s$-th beams being focused in a second transmit focal zone having a range different than that of said first transmit focal zone;
  (b) provide said receive beamformer with receive control data that cause said receive beamformer to form $(K_s+1)$-th through $2K_s$-th beamsummed receive signals from $(K_s+1)$-th through $2K_s$-th sets of signals transduced by said transducer array following transmission of said $(K_s+1)$-th through $2K_s$-th beams respectively;
  (c) provide said synthetic transmit aperture beamformer with synthetic transmit aperture control data that causes said synthetic transmit aperture beamformer to sum said $(K_s+1)$-th through $K_s$-th beamsummed receive signals to produce a second synthetic transmit aperture signal, said detector forming a second image signal derived from said second synthetic transmit aperture signal; and (d) provide said zone stitching processor with zone stitching control data that causes said zone stitching processor to stitch said first and second image signals together as part of a composite image signal for display by said display subsystem.

19. The system as defined in claim 17, wherein said first through $K_s$-th transmit subapertures are non-overlapping.

20. The system as defined in claim 17, wherein said first through $K_s$-th transmit subapertures are apodized and overlapping.

21. A system for imaging ultrasound scatterers, comprising:

an ultrasound transducer array including a multiplicity of transducer elements;

a display monitor for displaying an image which is a function of an image signal; and a computer programmed to perform the steps of:

(a) driving a first subaperture of said array with a first set of time delays to form a first beam focused in a first transmit focal zone;

(b) forming a first beamsummed signal from a first set of signals transduced by transducer elements of said array which form a receive aperture following transmission of said first beam;

(c) driving a second subaperture of said transducer array with a second set of time delays to form a second beam focused in said first transmit focal zone;

(d) forming a second beamsummed signal from a second set of signals transduced by said transducer elements of said receive aperture following transmission of said second beam;

(e) producing a synthetic transmit aperture signal by beamforming at least said first and second beamsummed receive signals;

(f) forming an image signal derived from said synthetic transmit aperture signal; and (g) displaying an image which is a function of said image signal on said display monitor.

\* \* \* \* \*